(12) United States Patent
Jung

(10) Patent No.: US 9,308,407 B2
(45) Date of Patent: Apr. 12, 2016

(54) FIXING BRACKET OF REDUCER FOR SPRINKLER

(71) Applicant: SEUNG JIN IND. CO., LTD, Gyeonggi-do (KR)

(72) Inventor: Ho Jin Jung, Gyeonggi-do (KR)

(73) Assignee: SEUNG JIN IND. CO., LTD., Ansan-si, Gyeonggi-do (KR)

( * ) Notice: Subject to any disclaimer, the term of this patent is extended or adjusted under 35 U.S.C. 154(b) by 0 days.

(21) Appl. No.: 14/318,018

(22) Filed: Jun. 27, 2014

(65) Prior Publication Data

US 2015/0360064 A1    Dec. 17, 2015

(30) Foreign Application Priority Data

Jun. 11, 2014    (KR) .......................... 10-2014-0070770

(51) Int. Cl.
| | |
|---|---|
| A62C 13/76 | (2006.01) |
| A62C 37/50 | (2006.01) |
| B05B 15/06 | (2006.01) |
| F16L 3/00 | (2006.01) |
| A62C 35/68 | (2006.01) |
| F16L 3/10 | (2006.01) |
| F16L 3/24 | (2006.01) |
| E21F 17/02 | (2006.01) |
| F16L 3/08 | (2006.01) |
| F16L 3/12 | (2006.01) |
| A47G 1/10 | (2006.01) |
| B42F 13/00 | (2006.01) |
| A62C 25/00 | (2006.01) |
| A62C 27/00 | (2006.01) |

(Continued)

(52) U.S. Cl.
CPC ................. *A62C 35/68* (2013.01); *F16L 3/003* (2013.01); *F16L 3/1075* (2013.01); *F16L 3/24* (2013.01); *F16B 2/10* (2013.01); *F16B 7/0493* (2013.01)

(58) Field of Classification Search
CPC ............... F16L 3/133; F16L 3/24; F16L 3/11; F16L 3/127; F16L 3/16; F16L 3/003; F16L 3/02; F16B 2/065; F16B 2/10; Y10T 292/0807; Y10T 292/702; A62C 35/68; A62C 33/04
USPC ................... 248/62, 65, 74.1, 316.5, 343, 75; 24/270; 182/186.8; 285/364; 403/385; 169/37, 41, 51

See application file for complete search history.

(56) References Cited

U.S. PATENT DOCUMENTS 3,042,430 A * 7/1962 Guy ............................... 285/365
3,476,410 A * 11/1969 Pastva, Jr. ..................... 285/112

(Continued)

FOREIGN PATENT DOCUMENTS

| KR | 20-0358189 Y1 | 8/2004 |
|---|---|---|
| KR | 10-1289274 B1 | 7/2013 |

*Primary Examiner* — Syed A Islam
*Assistant Examiner* — Taylor Morris
(74) *Attorney, Agent, or Firm* — Rabin & Berdo, P.C.

(57) ABSTRACT

A fixing bracket of a reducer for a sprinkler, the fixing bracket including: a body portion including a bottom wall having a predetermined width and a pair of bather walls which are disposed at both sides of the bottom wall and between which the bottom wall is interposed, wherein an insertion portion through which a reducer is mounted on the body portion, is perforated in a center of the pair of barrier walls; and a coupling portion that is rotatably coupled to one side of the body portion using a hinge shaft, wherein a fastening concave groove is formed in a top end of one side of the bather walls of the body portion, and the coupling portion includes a cover member, a pivoting member that is pivotably coupled to the cover member, and a fastening member that is separably coupled to the pivoting member.

4 Claims, 5 Drawing Sheets

(51) Int. Cl.
*A62C 29/00* (2006.01)
*F16B 2/10* (2006.01)
*F16B 7/04* (2006.01)

(56) References Cited

U.S. PATENT DOCUMENTS

| | | | |
|---|---|---|---|
| 3,828,403 A * | 8/1974 | Perrin et al. | 24/270 |
| 4,272,871 A * | 6/1981 | Weinhold | 24/270 |
| 5,259,690 A * | 11/1993 | Legge | 403/385 |
| 6,786,302 B2 * | 9/2004 | Liew et al. | 182/186.8 |
| 7,735,787 B2 * | 6/2010 | Kafenshtok et al. | 248/75 |
| 2011/0260012 A1 * | 10/2011 | Oh | 248/89 |
| 2011/0284098 A1 * | 11/2011 | Silcox et al. | 137/15.18 |
| 2013/0048822 A1 * | 2/2013 | Liu et al. | 248/316.5 |
| 2014/0360737 A1 * | 12/2014 | Kim | F16L 3/00 169/51 |

\* cited by examiner

FIXING BRACKET OF REDUCER FOR SPRINKLER

CROSS-REFERENCE TO RELATED APPLICATION

This application claims priority to and the benefit of Korean Patent Application No. 2014-0070770, filed on 11 Jun. 2014, the disclosure of which is incorporated herein by reference in its entirety.

BACKGROUND

1. Field of the Invention

The present invention relates to a fixing bracket of a reducer for a sprinkler, and more particularly, to a fixing bracket of a reducer for a sprinkler, in which the reducer for the sprinkler is capable of being stably fixed and the fixing bracket is capable of being conveniently and easily attached to or detached from the reducer.

2. Discussion of Related Art

As buildings become high-rise and large-sized, sprinklers that may put out fires when the fires break out in buildings, are obligatorily installed at buildings.

A sprinkler supplies water with a high pressure from a ceiling part of a building and sprays water.

In order to install the sprinkler, a main water supply pipe that supplies water into an inner side of a ceiling is installed, and the sprinkler is coupled to the main water supply pipe using a connection pipe that connects a plurality of branched water supply pipes.

In order to supply water by connecting the plurality of branched water supply pipes and the sprinkler, a flexible tube that is flexibly bent and is manufactured of a metal, is widely used.

An outer circumferential surface of the flexible tube is wrinkled in a spiral form so that the flexible tube can be flexibly bent, and an O-ring and a fastening ring are solidly fixed to portions that are connected to the branched water supply pipes so that a tubular body can be prevented from being damaged due to pressure generated when water with the high pressure flows.

One end of the flexible tube is connected to the branched water supply pipes and the other end of which is coupled to a connection pipe referred to as a reducer to which the sprinkler is fixed.

A fixing member is used to solidly fix the reducer not to be rotatable.

FIG. 1 is a view of an installation structure of a sprinkler according to the related art.

As illustrated in FIG. 1, in the installation structure of the sprinkler according to the related art, a rectangular bar 16 is put on a pair of ceiling bars 14 in a right-angled direction, and the pair of ceiling bars 14 are coupled to each other in a manner of tightening a plurality of bolts, using a ceiling bar fixing bracket 20, and in order to fix a reducer 12, a flexible tube 10, and a sprinkler head 13 to the rectangular bar 16, a reducer fixing bracket 30 is coupled to the rectangular bar 16 in the manner of tightening a plurality of bolts.

Since the reducer fixing bracket 30 according to the related art performs a fixing operation using several bolts, an assembling structure is complicated and cumbersome so that workability is lowered.

Also, the reducer fixing bracket 30 according to the related art requires a separate tool so that a user can tighten bolts in a bolt tightening manner. In addition, it is very inconvenient to carry out an installation work due to detachment and loss of the bolts while the reducer fixing bracket 30 is moved.

The reducer fixing bracket 30 according to the related art fixes the reducer 12 so that the bolts can directly contact the rectangular bar 16, so as to fix the reducer 12 to the rectangular bar 16. Thus, an area in which the bolts contact the rectangular bar 16, is small, and a clamping force is lowered.

Since the reducer fixing bracket 30 according to the related art fixes the reducer 12 so that the bolts can directly contact the rectangular bar 16, the rectangular bar 16 may be damaged due to a bolt-tightening pressure, and due to the damage, when the rectangular bar 16 is moved, a tightening pressure of the bolts is lowered such that the clamping force and stability of a product may be lowered.

In addition, when the reducer fixing brackets according to the related art are detached from or attached to the reducer as the reducer is replaced with another one or is moved, the bolts need to be loosened or tightened. Thus, there are many inconveniences.

PRIOR-ART DOCUMENT

Patent Document

1. Korean Utility-model Registration No. 20-0358189 (published on Jul. 28, 2004)
2. Korean Patent Registration No. 10-1289274 (published on Jul. 18, 2013)

SUMMARY OF THE INVENTION

The present invention is directed to a fixing bracket of a reducer for a sprinkler, in which the reducer for the sprinkler is capable of being stably fixed and the fixing bracket is capable of being conveniently and easily attached to or detached from the reducer.

The present invention is also directed to a fixing bracket of a reducer for a sprinkler, in which the fixing bracket is capable of being conveniently detached to or attached from the reducer in a one touch manner.

According to an aspect of the present invention, there is provided a fixing bracket of a reducer for a sprinkler, the fixing bracket including: a body portion including a bottom wall having a predetermined width and a pair of barrier walls which are disposed at both sides of the bottom wall and between which the bottom wall is interposed, wherein an insertion portion through which a reducer is mounted on the body portion, is perforated in a center of the pair of barrier walls; and a coupling portion that is rotatably coupled to one side of the body portion using a hinge shaft, wherein a fastening concave groove may be formed in a top end of one side of the barrier walls of the body portion, and the coupling portion may include a cover member, a pivoting member that is pivotably coupled to the cover member, and a fastening member that is separably coupled to the pivoting member.

The cover member may include an upper wall and a pair of cover side walls, and a cover coupling hole may be formed in a front end of a front of the pair of cover side walls.

A pin coupling portion may be formed at a front end of the pivoting member, and an opening/closing grip portion that is used by a user for coupling or separation may be formed at a rear end of the pivoting member, and a first coupling hole and a second coupling hole may be formed in the pin coupling portion.

The first coupling hole of the pin coupling portion may be installed to face the cover coupling hole of the cover member and may be pivotably fastened to the cover coupling hole of the cover member using a first pivoting pin.

A hook portion that is coupled to or separated from the fastening concave groove of the body portion may be formed integrally with a front end of the fastening member, and a fastening protrusion coupled to the pivoting member may be formed at a rear end of the fastening member.

A fastening hole that corresponds to a second coupling hole of the pin coupling portion may be formed in the fastening protrusion, and the second coupling hole and the fastening hole may be pivotably fastened to each other using a second pivoting pin.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a fixing bracket of a reducer for a sprinkler according to various embodiments of the present invention will be described in detail with reference to the accompanying drawings.

Figure 1:
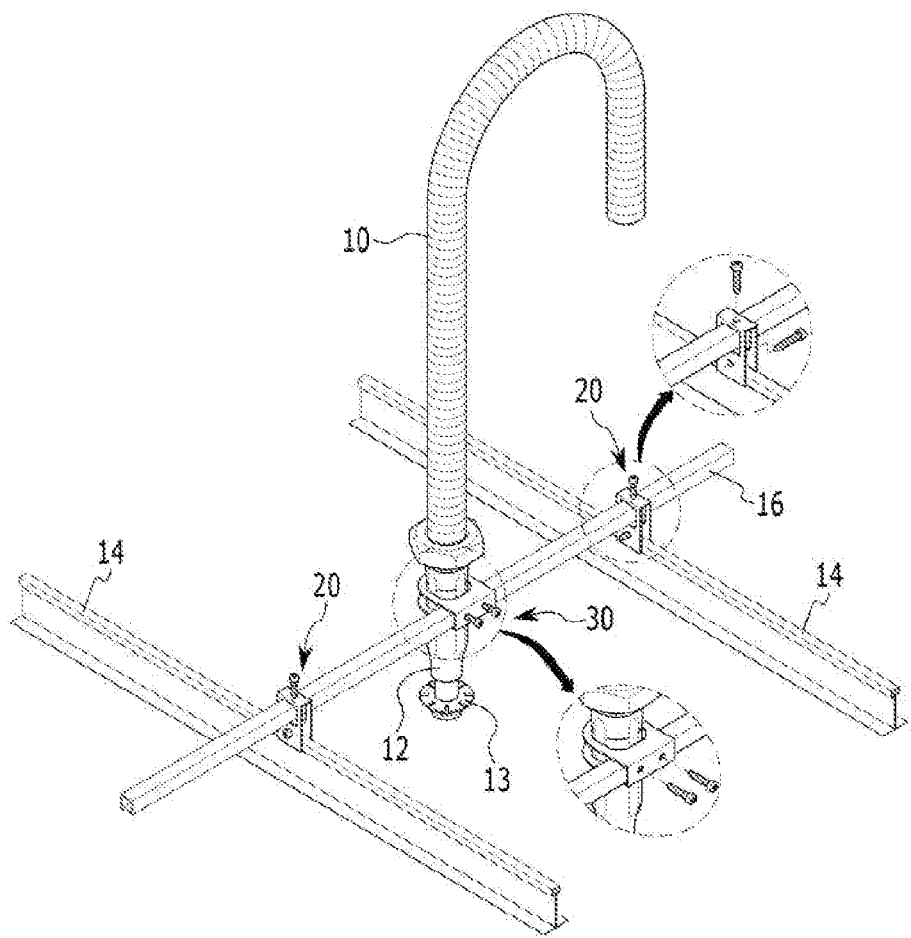
FIG. 1 is a view of an installation structure of a sprinkler according to the related art.
Figure 2:
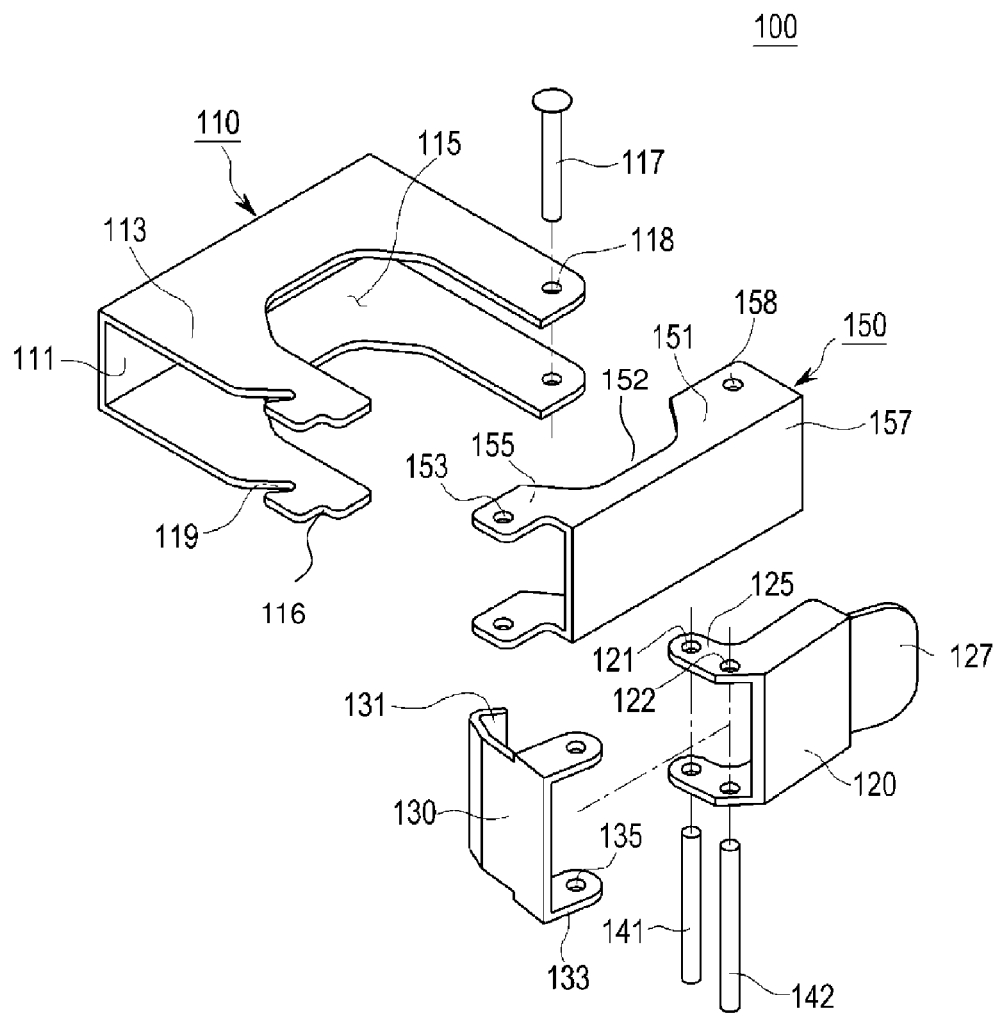
FIG. 2 is an exploded perspective view of a fixing bracket of a reducer for a sprinkler according to an embodiment of the present invention.
Figure 3:
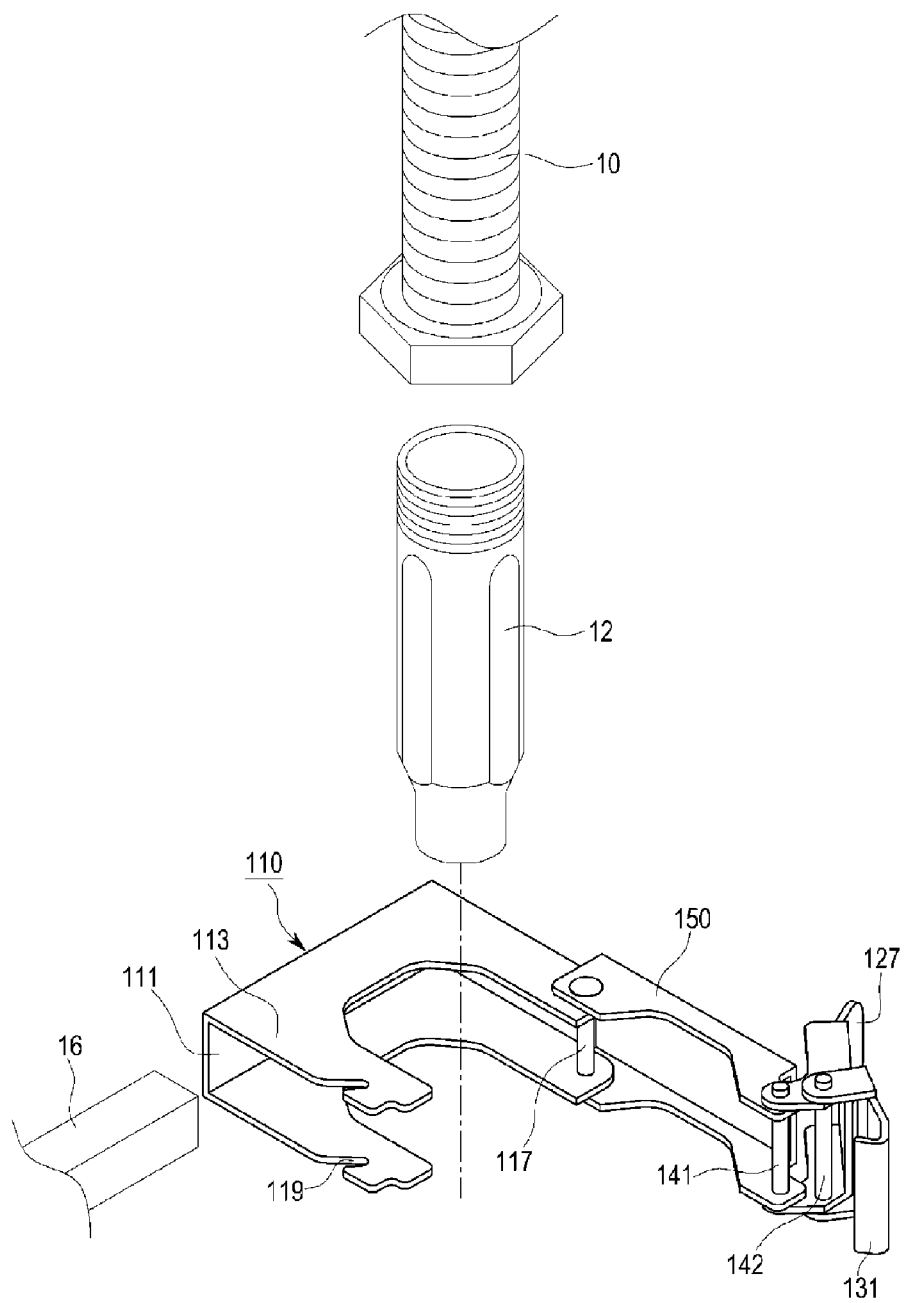
FIG. 3 is a perspective view illustrating a state in which the fixing bracket illustrated in FIG. 2 is opened.

FIG. 2 is an exploded perspective view of a fixing bracket of a reducer for a sprinkler according to an embodiment of the present invention, and FIG. 3 is a perspective view illustrating a state in which the fixing bracket illustrated in FIG. 2 is opened.

A fixing bracket 100 of a reducer for a sprinkler according to an embodiment of the present invention includes a body portion 110 and a coupling portion that are formed by cutting and bending a steel plate made by press working.

The coupling portion includes a cover member 150, a pivoting member 120 that is pivotably coupled to the cover member 150, and a fastening member 130 that is separably coupled to the pivoting member 120.

The body portion 110 includes a bottom wall 111 having a predetermined width and a pair of barrier walls 113 which are disposed at both sides of the bottom wall 111 and between which the bottom wall 111 is interposed. An insertion portion 115 through which a reducer 12 is mounted on the body portion 110, is perforated in the center of the pair of barrier walls 113. Also, a fastening concave groove 119 is inclined in an upper part of a front end of the body portion 110 upward, and a first hinge hole 118 into which the cover member 150 is coupled using a hinge, is formed in an upper part of a rear end of the body portion 110. The body portion 110 further includes a groove 116 formed in a top corner of the barrier walls 113 of the body portion to receive a first pivoting pin 141.

Thus, when the reducer 12 is mounted on the insertion portion 115 and the fastening member 130 is coupled to the body portion 110 by actuating the coupling portion, the reducer 12 is fixed to the fixing bracket 100 while being inserted into the fixing bracket 100.

The insertion portion 115 may be formed to correspond to a shape of the reducer 12.

The cover member 150 includes an upper wall 157 and a pair of cover side walls 151. A cover coupling hole 153 is formed in a front end 155 of the front of the pair of cover side walls 151, and a second hinge hole 158 that corresponds to the first hinge hole 118 is formed in the rear of the cover side walls 151. Each cover side wall 151 of the cover member 150 has a cur off 152 formed in a middle portion thereof in a half-moon shape to accept the reducer 12.

Thus, the body portion 110 and the cover member 150 can be pivoted around a hinge shaft 117 that is inserted into the first hinge hole 118 and the second hinge hole 158.

Also, a first coupling hole 121 and a second coupling hole 122 are formed in a pin coupling portion 125 at a front end of the pivoting member 120, and an opening/closing grip portion 127 that is used by a user for coupling or separation is formed integrally with a rear end of the pivoting member 120.

The first coupling hole 121 of the pin coupling portion 125 is installed to face the cover coupling hole 153 of the cover member 150 and is pivotably fastened thereto using a first pivoting pin 141.

Also, the fastening member 130 is pivotably coupled to the front end of the pivoting member 120. A hook portion 131 that is coupled to or separated from the fastening concave groove 119 of the body portion 110 is formed integrally with a front end of the fastening member 130, and a fastening protrusion 133 that is coupled to the pivoting member 120 is formed at a rear end of the fastening member 130.

A fastening hole 135 that corresponds to the second coupling hole 122 of the pin coupling portion 125 is formed in the fastening protrusion 133. Thus, the second coupling hole 122 and the fastening hole 135 are pivotably fastened to each other using a second pivoting pin 142.

Hereinafter, an operation of the fixing bracket of the reducer for the sprinkler according to an embodiment of the present invention will be described.

Figure 4:
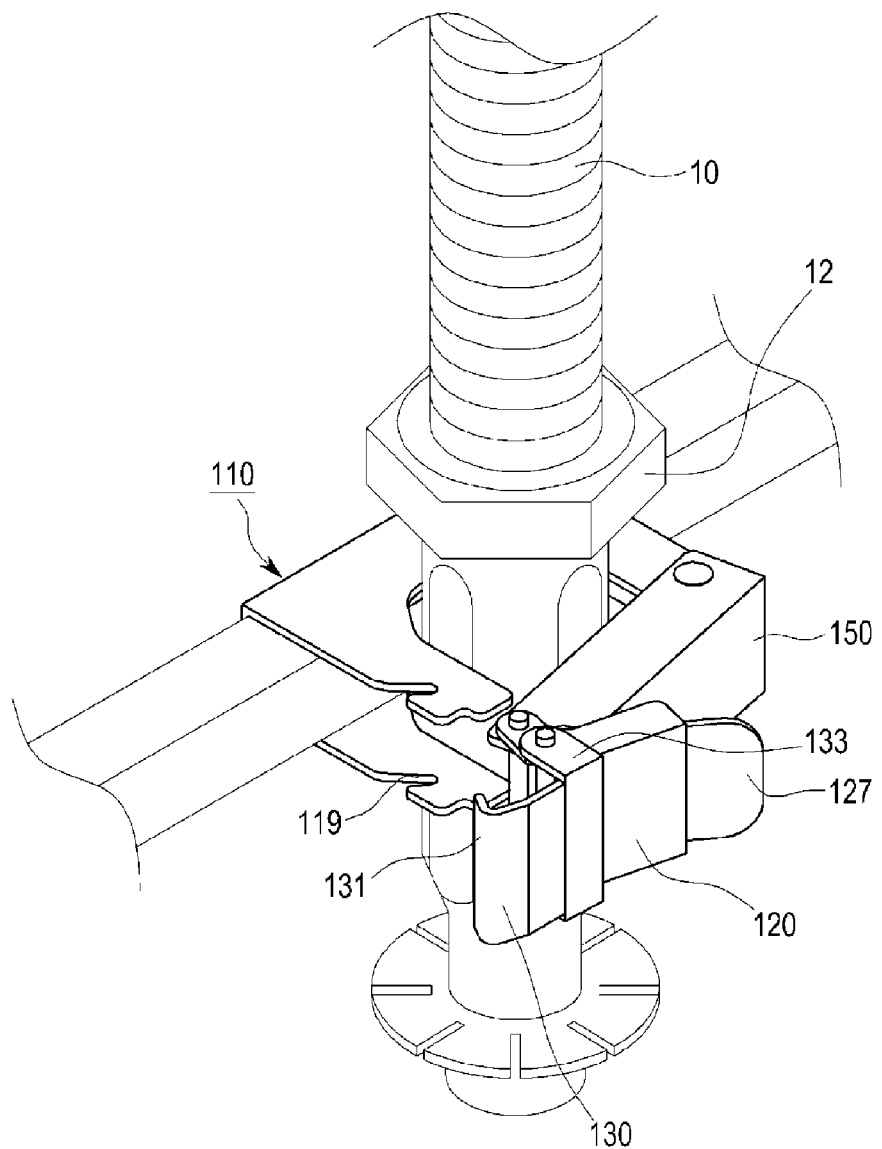
FIG. 4 is a perspective view illustrating a state in which the fixing bracket of FIG. 2 operates.
Figure 5:
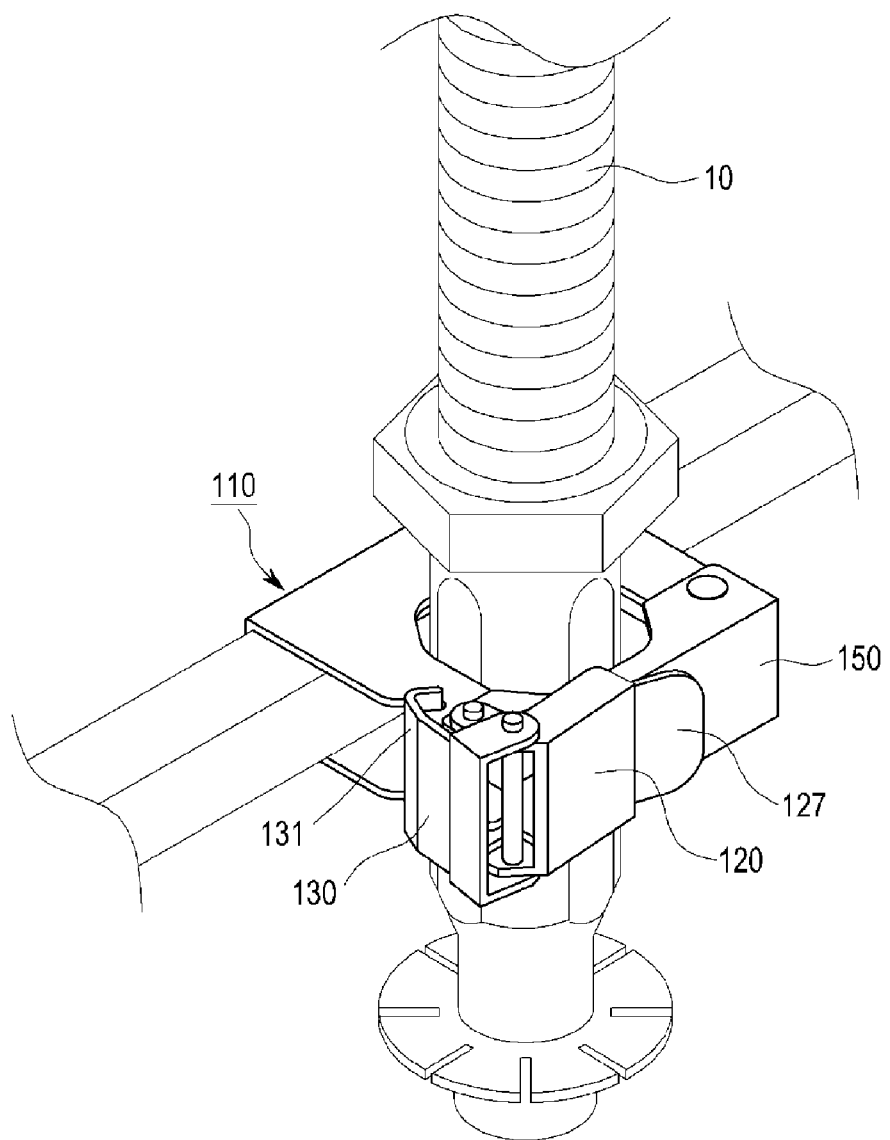
FIG. 5 is a perspective view illustrating a state in which the fixing bracket of FIG. 2 and the reducer are coupled to each other.

FIG. 4 is a perspective view illustrating a state in which the fixing bracket of FIG. 2 operates, and FIG. 5 is a perspective view illustrating a state in which the fixing bracket of FIG. 2 and the reducer are coupled to each other.

As illustrated in FIG. 4, in order to couple the reducer 12 to the fixing bracket 100, the reducer 12 is disposed at the insertion portion 115 of the fixing bracket 100. Thereafter, the user grips the opening/closing grip portion 127 and pushes the pivoting member 120 forward so that the fastening member 130 can be directed forward and downward. Then, the cover member 150, the pivoting member 120, and the fastening member 130 are pivoted with respect to each other and are moved toward the body portion 110. In this case, the hook portion 131 of the fastening member 130 is inserted into the fastening concave groove 119 of the body portion 110.

In this way, when the user pressurizes the opening/closing grip portion 127 in a state in which the hook portion 131 is inserted into the fastening concave groove 119, the hook portion 131 is hung in the fastening concave groove 119, and the pivoting member 120 is disposed to be fastened to a top end of the cover member 150 due to interaction between the fastening member 130 and the cover member 150 (See FIG. 5).

In contrast, when the reducer 12 is replaced with another one or is separated from the fixing bracket 100 for repair in a state in which the fixing bracket 100 is fastened, as illustrated in FIG. 5, the user grips the opening/closing grip portion 127 and pulls it upward, the pivoting member 120 is pivoted due to a pivoting motion of the pin coupling portion 125 and the fastening protrusion 133 of the fastening member 130 so that the hook portion 131 can be separated from the fastening concave groove 119.

As described above, a fixing bracket of a reducer for a sprinkler according to the present invention is fixed directly to the reducer using a one touch method without using a bolt tightening method so that the fixing bracket can be conveniently and easily detached from or attached to the reducer and a clamping force can be enhanced.

According to the present invention, the reducer is fixed to a rectangular bar using the fixing bracket of the reducer using a one touch method so that a separate tool is not required and problems can be prevented from occurring due to detachment and loss of bolts.

According to the present invention, the fixing bracket of the reducer that uses a one touch method is used to fix the reducer to the rectangular bar so that workability is excellent and a clamping force and stability are excellent.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fixing bracket of a reducer for a sprinkler, the fixing bracket comprising:
   a body member comprising
      a bottom wall having a predetermined width,
      a pair of barrier walls which are disposed at both sides of the bottom wall and between which the bottom wall is interposed and including
         an insertion portion formed in a center portion of said each of the pair of barrier walls, through which a reducer is mounted on the body member, and
         a first fastening concave groove formed in a top end portion of a first side of said each of the pair of barrier walls of the body member;
   a cover member configured to couple to a second side of the body member using a hinge shaft and including
      an upper wall having a flat plate shape, and
      a pair of cover side walls disposed at both sides of the upper wall, each of the pair of cover side walls having a cut off formed in a middle portion of said each of the pair of cover side walls in a half-moon shape to accept the reducer,
      a front wing formed in a first end of said each of the pair of cover side walls and extending out toward a longitudinal direction of the pair of cover side walls, and
      a cover coupling hole formed in the front wing of said each of the pair of cover side walls;
   a pivoting member configured to pivotably couple to the cover member and including
      pin coupling wings formed at a first end of the pivoting member and protruding from both sides of the pivoting member,
      a first coupling hole formed in an end portion of each of the pin coupling wings, and
      a second coupling hole formed in an inner portion of said each of the pin coupling wings; and
   a fastening member configured to separably couple to the pivoting member and including
      a hook formed in a first side of the fastening member to engage with the first fastening concave groove of the body member,
      fastening protrusions formed in a second side of the fastening member integrally with the hook and protruding from both sides of the fastening member, and
      fastening hole formed in each of the fastening protrusions; and
   a first pivoting pin having a cylindrical shape and configured to be inserted through the cover coupling hole of the cover member and the first coupling hole of the pivoting member to couple the pivoting member to the cover member; and
   a second pivoting pin having a cylindrical shape and configured to be inserted through the fastening hole of the fastening member and the second coupling hole of the pivoting member to couple the fastening member to the pivoting member,
   wherein said each of the barrier walls further includes a second fastening concave groove formed in a top corner of the first side thereof for receiving the first pivoting pin.

2. The fixing bracket of the reducer for the sprinkler of claim 1, wherein the pivoting member further including
   an opening/closing gripper formed at a second end of the pivoting member to make it easier to fasten or loosen the fastening member to/from the fastening concave groove.

3. The fixing bracket of the reducer for the sprinkler of claim 2, wherein the first coupling hole of the pin coupling wings is installed to face the cover coupling hole of the cover member and is pivotably fastened to the cover coupling hole of the cover member using the first pivoting pin.

4. The fixing bracket of the reducer for the sprinkler of claim 1, wherein
   the second coupling hole and the fastening hole are pivotably fastened to each other using the second pivoting pin.

* * * * *